(12) United States Patent
Price et al.

(10) Patent No.: US 11,877,088 B2
(45) Date of Patent: Jan. 16, 2024

(54) CONTRAST ENHANCED IMAGES COMPOSITED WITH ARTIFICIAL COLORIZATION

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US); Benjamin Brown, Seattle, WA (US); Casey Lee Miller, Fort Collins, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 497 days.

(21) Appl. No.: 17/125,889

(22) Filed: Dec. 17, 2020

(65) Prior Publication Data

US 2022/0201239 A1 Jun. 23, 2022

(51) Int. Cl.
*H04N 5/57* (2006.01)
*G06T 5/00* (2006.01)
*G06T 5/40* (2006.01)
*H04N 5/33* (2023.01)
*H04N 9/64* (2023.01)

(52) U.S. Cl.
CPC ............ *H04N 5/57* (2013.01); *G06T 5/008* (2013.01); *G06T 5/40* (2013.01); *H04N 5/33* (2013.01); *H04N 9/646* (2013.01)

(58) Field of Classification Search
CPC . H04N 5/57; H04N 5/53; H04N 9/646; G06T 5/008; G06T 5/40

USPC ......................................................... 382/274
See application file for complete search history.

(56) References Cited

U.S. PATENT DOCUMENTS

| | | |
|---|---|---|
| 8,836,793 B1 | 9/2014 | Kriesel et al. |
| 10,848,725 B2 | 11/2020 | Chahine et al. |
| 11,195,233 B1 * | 12/2021 | Carbery ............. G06Q 30/0629 |
| 2016/0093034 A1 | 3/2016 | Beck et al. |
| 2018/0158197 A1 * | 6/2018 | Dasgupta ............. H04N 13/282 |

(Continued)

OTHER PUBLICATIONS

"International Search Report and Written Opinion Issued in PCT Application No. PCT/US21/060410", dated Mar. 25, 2022, 11 Pages.

(Continued)

*Primary Examiner* — Michael R Neff
(74) *Attorney, Agent, or Firm* — Alleman Hall Creasman & Tuttle LLP

(57) ABSTRACT

A method for enhancing digital imagery. The method comprises receiving a linear, intensity-based image of an environment. A histogram of intensity values is generated for a plurality of pixels within the linear, intensity-based image. Based on the histogram of intensity values, local contrast enhancement is applied to the linear, intensity-based image to generate a contrast enhanced version of the linear, intensity-based image, and artificial colorization is applied to the linear, intensity-based image to generate an artificially colorized version of the linear, intensity-based image. A composite image of the environment is then generated based on at least a portion of the contrast enhanced version of the linear, intensity-based image and at least a portion of the artificially colorized version of the linear, intensity-based image.

20 Claims, 7 Drawing Sheets

(56) References Cited

U.S. PATENT DOCUMENTS

2021/0149441 A1* 5/2021 Bartscherer ........... G06F 1/1616

OTHER PUBLICATIONS

Orlosky, et al., VisMerge: Light Adaptive Vision Augmentation via Spectral and Temporal Fusion of Non-visible Light, In Proceedings of IEEE International Symposium on Mixed and Augmented Reality, Oct. 9, 2017, pp. 22-31.

* cited by examiner

CONTRAST ENHANCED IMAGES COMPOSITED WITH ARTIFICIAL COLORIZATION

BACKGROUND

Relative object temperatures in an environment may be estimated from thermal images. Pixels of a thermal image may encode thermal intensity values that express relative amounts of thermal energy received by a thermal camera from objects in the environment. Warmer objects, such as mammals, may be discerned from inanimate background objects based on differing amounts of thermal radiation received at pixels of the thermal camera. The resulting thermal images can be colorized for ease of object recognition based on the relative intensity values.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for enhancing digital imagery. The method comprises receiving a linear, intensity-based image of an environment. A histogram of intensity values is generated for a plurality of pixels within the linear, intensity-based image. Based on the histogram of intensity values, local contrast enhancement is applied to the linear, intensity-based image to generate a contrast enhanced version of the linear, intensity-based image, and artificial colorization is applied to the linear, intensity-based image to generate an artificially colorized version of the linear, intensity-based image. A composite image of the environment is then generated based on at least a portion of the contrast enhanced version of the linear, intensity-based image and at least a portion of the artificially colorized version of the linear, intensity-based image.

DETAILED DESCRIPTION

A head-mounted display for use in certain settings may include low-light cameras and thermal imaging devices. Example settings/scenarios include use by first responders, public safety personnel, search-and-rescue teams, or other applications in which good visibility is needed for a user/wearer of the device to successfully perceive and move through their physical surroundings.

Postprocessing of raw camera streams on such devices may be done to optimize the visual information presented to the user. Such postprocessing may include the colorization of objects of interest, such as humans, and enhancing contrast of low-intensity image portions to increase image quality, for example to facilitate low light navigation.

Thermal cameras may provide a linear, greyscale image of objects that are cool in black, and objects that are hot in white, with varying degrees of grey corresponding to an approximate temperature (e.g., thermal intensity value) for each of a plurality of pixels of the thermal image, including pixels corresponding to human subjects that may be in the environment. The thermal camera may in some cases be integrated into a head-mounted display device (or other computing device configured to perform functions described herein), or may alternatively be a standalone camera or a component of a separate camera system. The thermal intensity values of the thermal image encode the amount of thermal energy emitted by the objects in the real-world environment and received by pixels of the thermal camera. Thus, a user viewing a thermal image of the real-world environment may quickly ascertain the temperature of objects in the environment, allowing for rapid identification of warm objects, such as humans and other mammals, even in low-light conditions.

Figure 1:
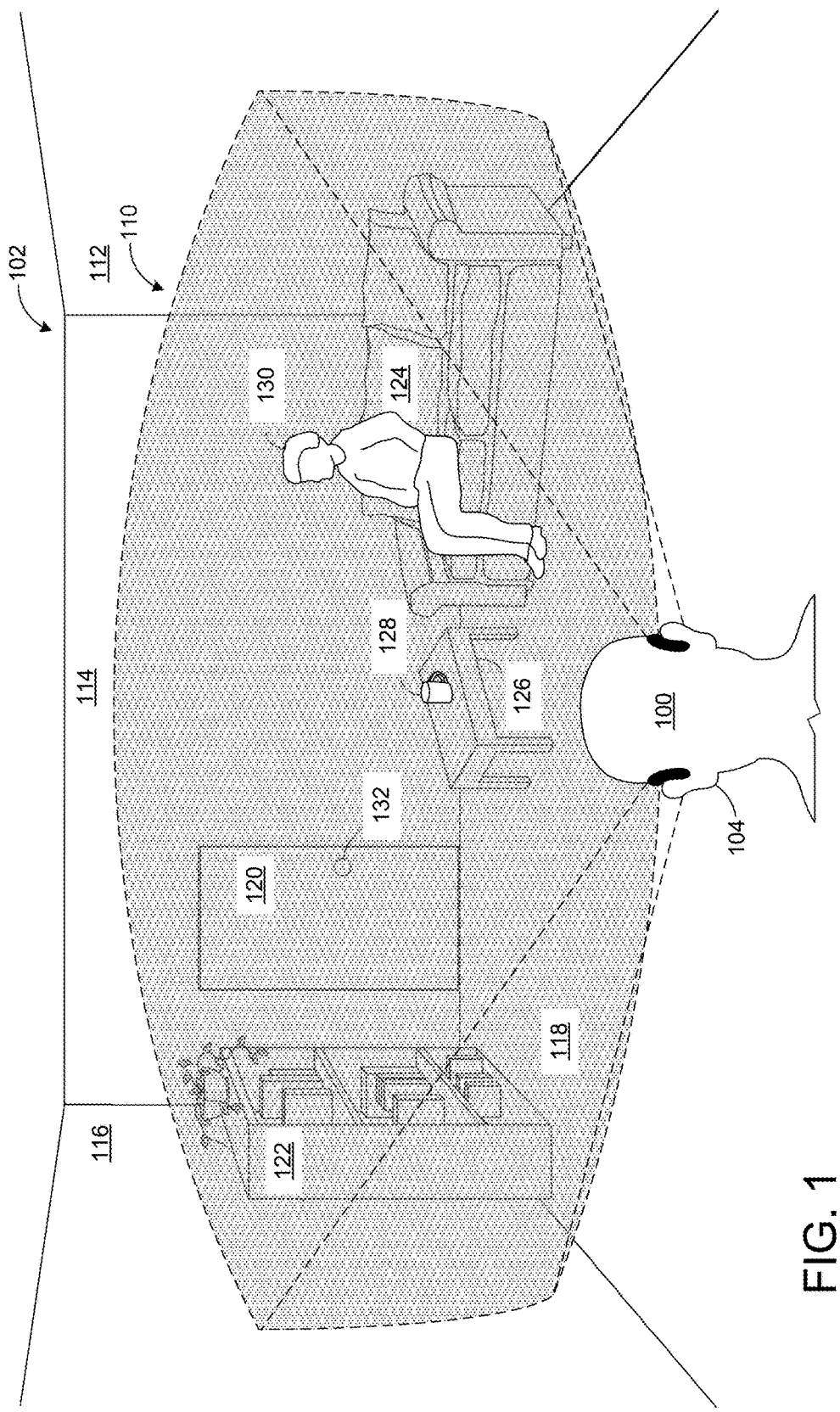
FIG. 1 shows an example wearable computing system within an environment.

As an example, FIG. 1 depicts a user 100 viewing an example environment 102 through head-mounted display system 104. User 100 perceives a field-of-view 110 of environment 102 based on thermal imagery detected by thermal imaging devices of head-mounted display system 104 and reprojected onto a display device of head-mounted display system 104. Environment 102 includes features such as walls 112, 114, and 116, floor 118, and door 120, and further includes objects such as bookcase 122, couch 124, coffee table 126, coffee mug 128, person 130, and doorknob 132.

The hottest objects within environment 102, shown in white, include person 130 and coffee mug 128. While the thermal image displayed on head-mounted display system 104 clearly indicates these objects to user 100, other objects and features, being inanimate and cold (shown in gray), may not be discernible (or less discernible) to user 100. This may make it difficult for user 100 to navigate environment 102 (e.g., the user might trip over objects or bump into walls), and may make it challenging to locate objects with lower thermal energy, such as doorknob 132, or specific books placed on bookcase 122.

Contrast enhancement may be performed on the thermal imagery in order to pull out some detail from objects of similar thermal energy. However, this is challenging when the scene includes an intensity profile that differs greatly between certain areas. In examples such as environment 102, user 100 is looking at an image of a scene that has mostly cool objects and some objects that are significantly warmer (person 130 and coffee mug 128). If appropriate tone mapping is not performed, the contrast enhanced image may either lose some of the fine detail in the cooler portions of the scene, or may saturate the warmer objects.

If enhanced contrast is provided, e.g., brightening up objects that are in the dark background, then information on the relative intensity or temperature of the objects in the scene may be lost. If colorization is performed on the enhanced contrast image based on a perceived temperature, some background objects may be colorized, while foreground information of interest may be lost. In effect, applying local contrast enhancement destroys global scene information, so that the user can no longer tell the hottest pixels of the image.

For augmented reality and virtual reality applications, it is important to generate images that support the user's ability to see relevant features and successfully move through their environment. A high dynamic range image will include areas that are relatively low intensity and areas that are relatively high intensity. Single pipeline methods for providing contrast and colorization tend to blend high-intensity objects into the background when the rest of the environment is contrast-enhanced.

Herein, systems and methods are presented where, rather than performing contrast enhancement and artificial colorization sequentially within a single pipeline, the processing of the linear, intensity-based image data is split into two pipelines. With a single pipeline, the desired amount of scene contrast may become unattainable, and/or some objects in the scene may be colored incorrectly. Instead, the image can be contrast enhanced in a first pipeline, and artificially colorized in a second pipeline. The two resulting images, and/or at least portions thereof, can then be composited together into a high contrast image where the highest intensity pixels are colorized.

In this way, the artificial colorization is performed on a non-enhanced image. Thus, image regions and objects having high intensity are preserved and can be presented as an object of interest. At the same time, the entire scene can have an enhanced level of contrast that is more visually useful to the user without falsely coloring background objects.

Herein, high-intensity objects, such as humans in thermal images, are effectively pulled out from the scene image to receive accurate colorization, and then fused back into the scene image. This generates high contrast images that preserve the original intensity information. Such an approach supports a wide range of contrast enhancement methods and colorization methods, so long as the resulting images can be recombined. The two pipelines may share computations that are needed for both sub-methods, increasing efficiency and allowing for near real-time image processing.

In some examples, the linear, intensity-based image may be divided into tiles, with contrast maximized on a tile-by-tile basis via histogram equalization. This is known as contrast limited adaptive histogram equalization (CLAHE) and is especially useful for processing imaged from thermal cameras, but is not limited to it.

Figure 2:
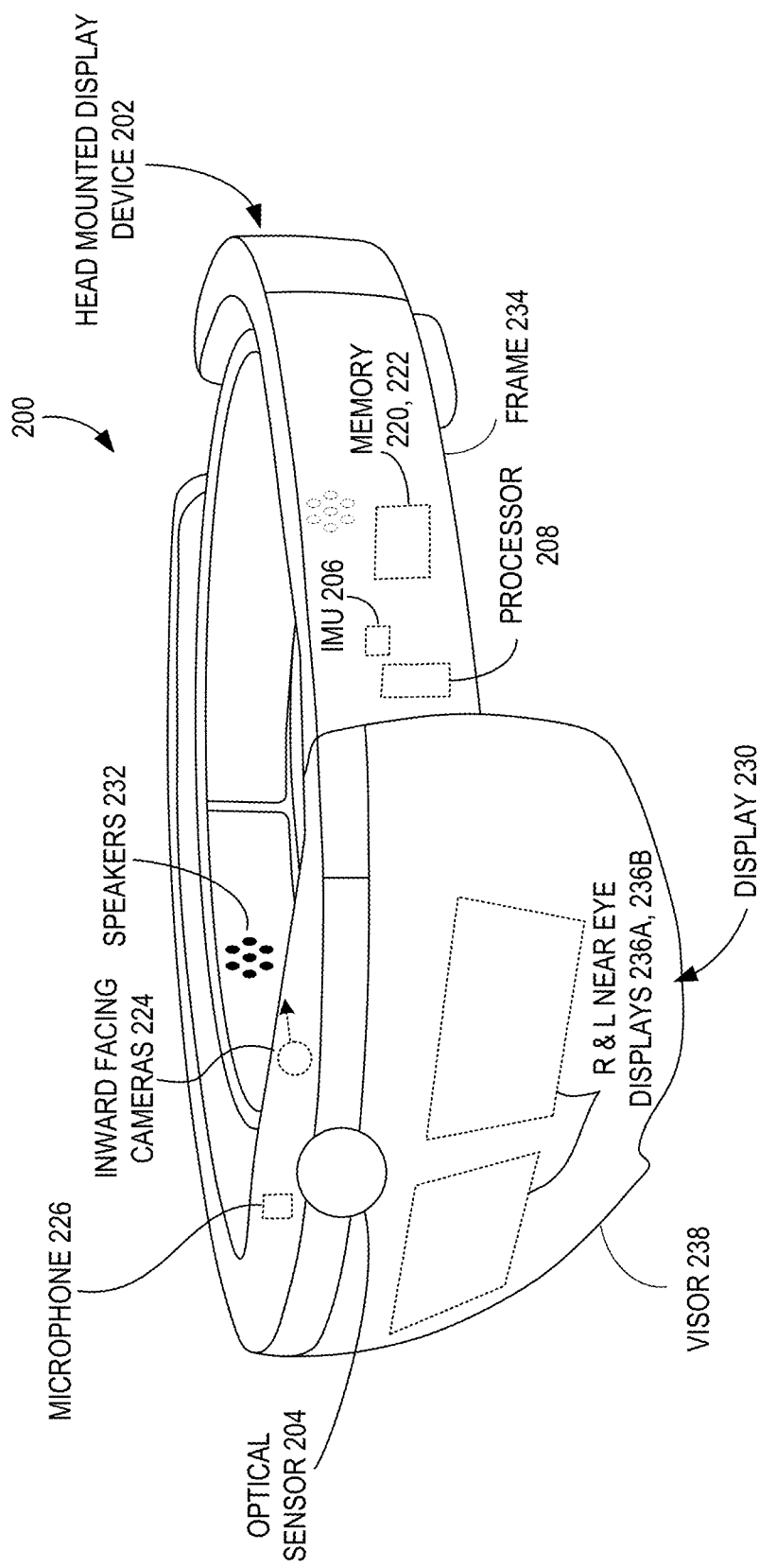
FIG. 2 is an example implementation of the computing system of FIG. 1.

FIG. 2 is an example implementation of the computing system 104 according to an example implementation of the present disclosure. In this example, as in FIG. 1, the computing system 200 is integrated into and/or implemented as an HMD device 202. In one example implementation, the computing system 200 may include one or more optical sensors, such as the depicted optical sensor 204 that may be a camera positioned centrally on an upper portion of HMD device 202 as shown in FIG. 2. Optical sensor 204 may include a RGB camera and/or low-light camera such as an IR camera configured for night vision. In some examples, optical sensor 204 may include a thermal camera, such as those configured to receive and detect IR light in a range of 8000 nm to 15,000 nm. It will be appreciated however that cameras included in the computing system 200 may be sensitive to various ranges of electromagnetic radiation as preferred by designers of the computing system 104, such as Ultra-Violet light, visible light, near infrared light, or other suitable frequencies. Herein, radiation detection over a limited frequency bandwidth may be referred to as linear, intensity-based imaging.

In some examples, a depth detection system (not shown) may also be included in the computing system 200 and integrated into the HMD device 202. The depth detection system may also include components such as a pair of stereo cameras and/or a pair of stereo low light level cameras. Alternatively, the depth detection system may include a single camera and an inertial measurement unit (IMU) 206. Other depth detection systems may include a single camera and a light projector, a pair of cameras and a light projector, and/or a laser light source and a camera. However, active stereo methods of depth detection may additionally process light projected by a projector that may be received at right and left cameras. A structured light method of depth detection may also be integrated into the computing system 200, in which case a projector and one camera to receive reflected projected light may be utilized. If a time-of-flight method of depth detection is preferred, the HMD device 202 may include a laser light source and corresponding sensor such as an IR laser in addition to a camera to receive reflected laser light. In another configuration, IMU 206 and a single camera may be used to detect depth.

The example computing system 200 includes a processor 208 and associated storage, which in FIG. 2 includes volatile memory 220 and non-volatile memory 222. The processor 208 is configured to execute instructions stored in the storage, using volatile memory 220 while executing instructions belonging to various programs and non-volatile memory 222 for storage of the programs. Other sensors that may be included in the computing system 200 as embodied in the HMD device 202 may be inward-facing cameras 224 to identify the position and orientation of each of a user's eyes and subsequently generate eye-tracking data. Also, a microphone 226 may receive natural language (NL) input from a user of the HMD device 202.

IMU 206 may be implemented in the HMD device 202 as described above, which may include accelerometers, gyroscopes, and/or a compass that can detect, for example, a 6 degree of freedom (6DOF) position and orientation of the HMD device 202. Processor 208 may further refine the 6DOF output of IMU 206 using visual tracking systems that search for movement of identified visual features in a series of images captured by optical sensor 204 and/or other cameras to generate an estimate of the relative movement of the HMD device 202 based upon the movement of these visual features within successive image frames captured by optical sensor 204 over time. It will be appreciated that components such as the microphone 226 and/or one or more optical sensors 204 may be integrated with the HMD device 202, or provided separately therefrom. It will be further appreciated that other types of sensors not displayed in FIG. 2 may be included in the computing system 200.

Figure 7:
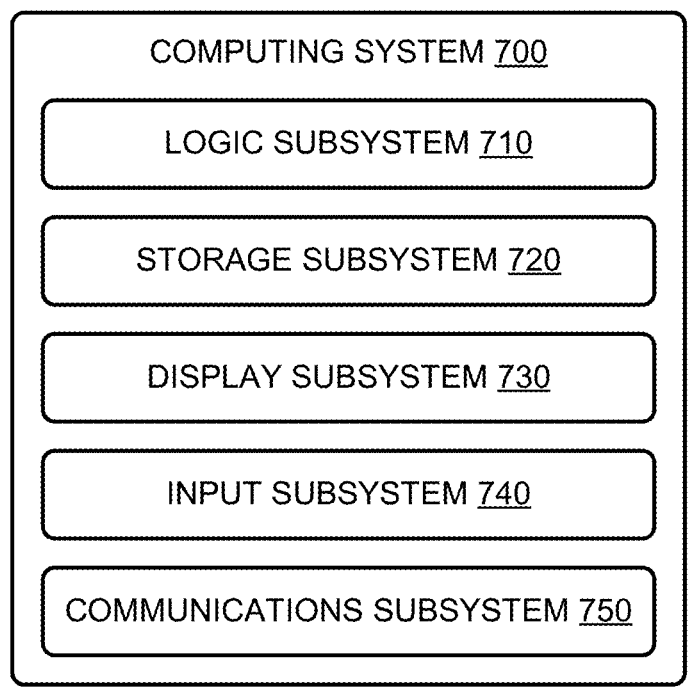
FIG. 7 is an example computing environment, which may be used to implement the computing system of FIG. 1.

A display 230 may be integrated with the HMD device 202, or optionally provided separately. Speakers 232 may also be included in the HMD device 202, or also provided separately. It will be appreciated that electronic and computing components may be connected via a bus. Furthermore, FIG. 7 depicts various computing system components that may correspond to the components of FIG. 2, and the descriptions of those components in FIG. 7 may therefore apply to such corresponding components in FIG. 2.

As shown in FIG. 2, the processor 208, volatile and non-volatile memories 220, 222, inward-facing cameras 224, optical sensor 204, microphone 262, IMU 206, and speakers 232 may be incorporated within a housing of HMD device 202 as shown. HMD device 202 may include a mounting frame 234 that at least partially encircles the head of a user, and the display 230 may include a pair of right and left near-eye displays 236A and 236B. The near-eye displays 236A and 236B may be positioned behind a visor 238 through which a user may observe the physical surroundings in an augmented reality (AR) system. It will be appreciated that the near eye displays 236A and 236B and visor 238 may be at least partially transparent, enabling the user to see through these components to view the real environment, at least when content is not opaquely displayed on the near-eye displays 236A and 236B.

While described predominantly in terms of augmented reality systems with see-through displays, the systems and methods described herein are equally applicable to virtual reality systems and other mixed reality systems that with more opaque display units. Similarly, while described predominantly with reference to head-mounted display units that include a single, centered optical sensor or camera, the systems and methods described are equally applicable head-mounted display units that include offset cameras and/or multiple cameras, including depth cameras in scenarios where processing speed and power limit the amount of depth information can be processed to enable near-real time image reprojection. Additionally, one or more additional computing devices, such as cloud computing devices may be communicatively coupled to the head-mounted display system in order to process image data and/or otherwise provide processing bandwidth to execute the described method and processes.

Figure 3:
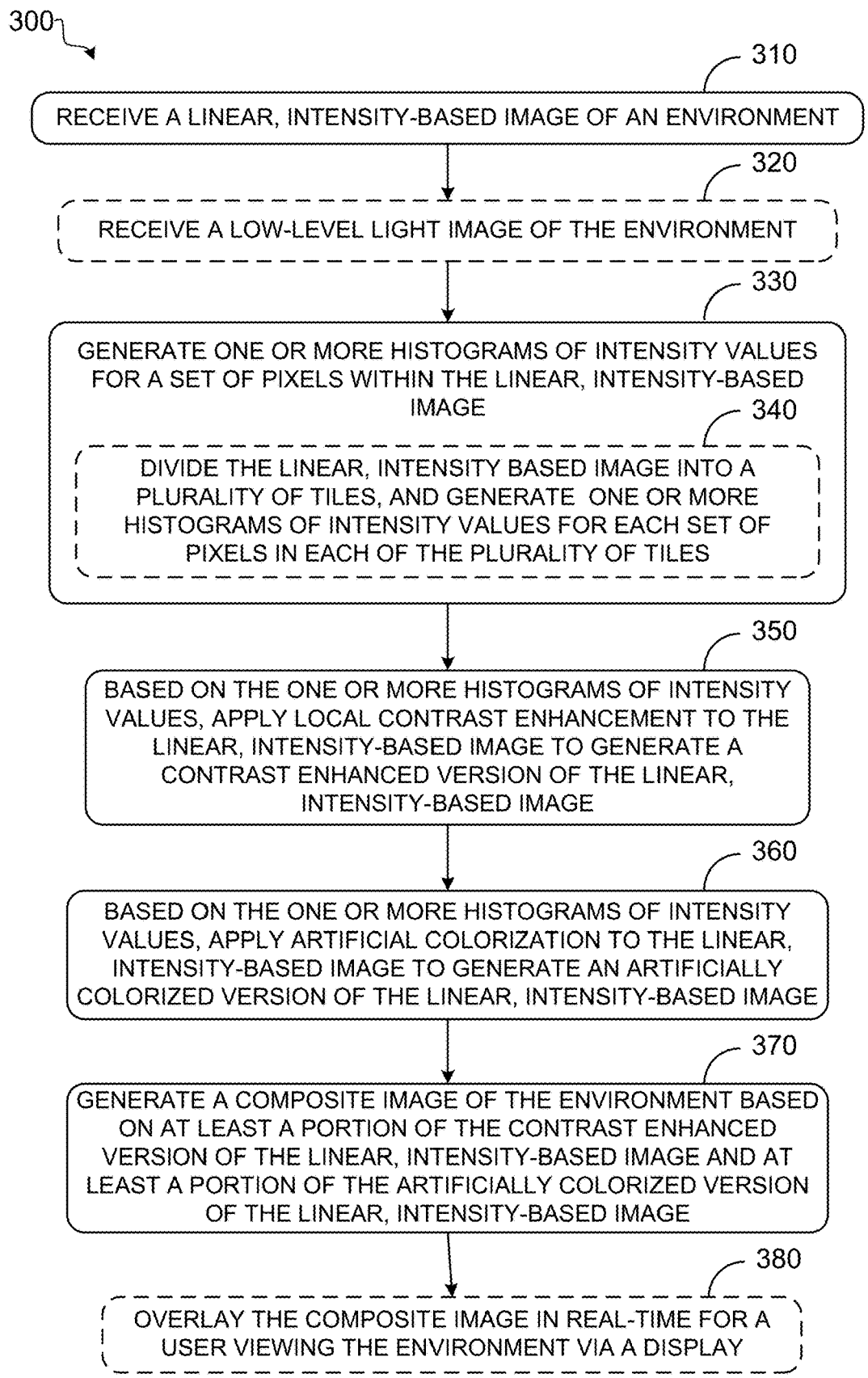
FIG. 3 is an example method for enhancing digital imagery based on a histogram of intensity values.

FIG. 3 depicts an example method 300 for enhancing digital imagery. While primarily addressing head-mounted displays and thermal imaging devices, such as computing system 200, method 300 may be implemented on any suitable computing system, having any suitable form factor and hardware configuration. Steps of method 300 may be distributed between any number of different computing devices. As examples, computing devices used to implement method 300 may include desktop computers, laptop computers, servers, smartphones, tablets, augmented/virtual/mixed reality devices, wearable devices (e.g., fitness watches), media centers, vehicle computer systems, dedicated camera/monitoring systems, etc. In some examples, method 300 may be implemented via computing system 700 described below with respect to FIG. 7.

At 310, method 300 includes receiving a linear, intensity-based image of an environment. For example, method 300 may include receiving, via a thermal camera, a thermal image captured of a real-world environment, the thermal image including thermal intensity values for each of a plurality of pixels of the thermal image. However, as described with regard to FIG. 2, a linear, intensity-based image may be received from any imaging device that provides an intensity value per pixel, regardless of frequency range (e.g., UV, near-IR, wide-range greyscale images). As discussed above, a thermal camera may be integrated into a computing device that performs one or more steps of method 300 beyond image capture. Alternatively, the thermal camera may be a standalone camera, or a component of a separate camera system. Thus, the one or more computing devices configured to implement steps of method 300 may in some case receive thermal images (and/or other images) from remote cameras.

The received linear, intensity-based image may be a raw image received directly from the optical sensors, raw image data that has undergone some degree of post-processing, such as the application of digital gain and/or fixed pattern noise removal. However, the received linear, intensity-based image may not have undergone contrast enhancement or colorization processing or any other processing that would alter the linear nature of the data, or the high dynamic range of the image.

In some cases, relatively higher radiation intensity values may correspond to regions in the imaged scene that are emitting relatively more thermal energy. In general, a "thermal camera" may include any imaging system configured to receive and encode thermal energy (e.g., infrared light) from objects in an environment. In some examples, a thermal camera may include a radiometric lens disposed before other optical elements of the thermal camera. Similarly, when included, visible light and depth cameras may take any suitable form. For instance, a depth camera may be a structured light depth camera or a time-of-flight depth camera. Any or all of the cameras of computing devices described herein may capture images having any suitable resolution, and the images may be captured with any suitable frame rate.

A linear, intensity-based image may take the form of any suitable data structure that includes a plurality of intensity values, which in turn encode radiation energy received by the imaging device from objects in an environment. In some cases, intensity values may take the form of grey-level counts, which may have any suitable value. The present disclosure primarily describes thermal and other linear, intensity-based images as having a plurality of pixels. However, it will be understood that a linear, intensity-based image need not be displayed on an electronic display, or otherwise visually represented in any manner. Rather, a linear, intensity-based image including a plurality of pixels may in some cases be a purely non-visual data structure. Alternatively, and as will be described in more detail below, some representation of a linear, intensity-based image may in some cases be visually displayed for review by a human user.

Optionally, in some examples, at 320 method 300 includes receiving a low-level light image of the environment. For example, an image may be captured by a low-level light camera module. In some examples, the low-level light image may be taken from a position offset from the linear, intensity-based image of the environment, and appropriate correction may be applied to align the two images. The low-level light image may be taken at the same time as, or within a threshold duration of the linear, intensity-based image, so as to ensure that minimal changes within the environment have occurred between the capture of the images.

Continuing at 330, method 300 includes generating one or more histograms of intensity values for a set of pixels within the linear, intensity-based image. For example, an intensity of radiation received at each pixel may be quantified and presented as a function of the frequency at which such an intensity is represented in the linear, intensity-based image. Optionally, at 340, method 300 includes dividing the linear, intensity-based image into a plurality of tiles; and generating one or more histograms of intensity values for each set of pixels in each of the plurality of tiles. In general, the plurality of tiles may be equal in size and shape, and may be non-overlapping. However, the size or each tile may be based on qualities of the linear, intensity-based image, on previous linear, intensity-based images (e.g., based on changes from recent images), on changes in the perspective of the imaging device, etc. In some examples, multiple sets of overlapping tiles may be generated in order to produce redundant data.

By tiling the linear, intensity-based image, the histograms for each tile may reveal different characteristics for local sections of the environment as compared to the environment as a whole. This may enable more specific image processing for each tile, rather than relying on histograms for the entire linear, intensity-based image.

Figure 4:
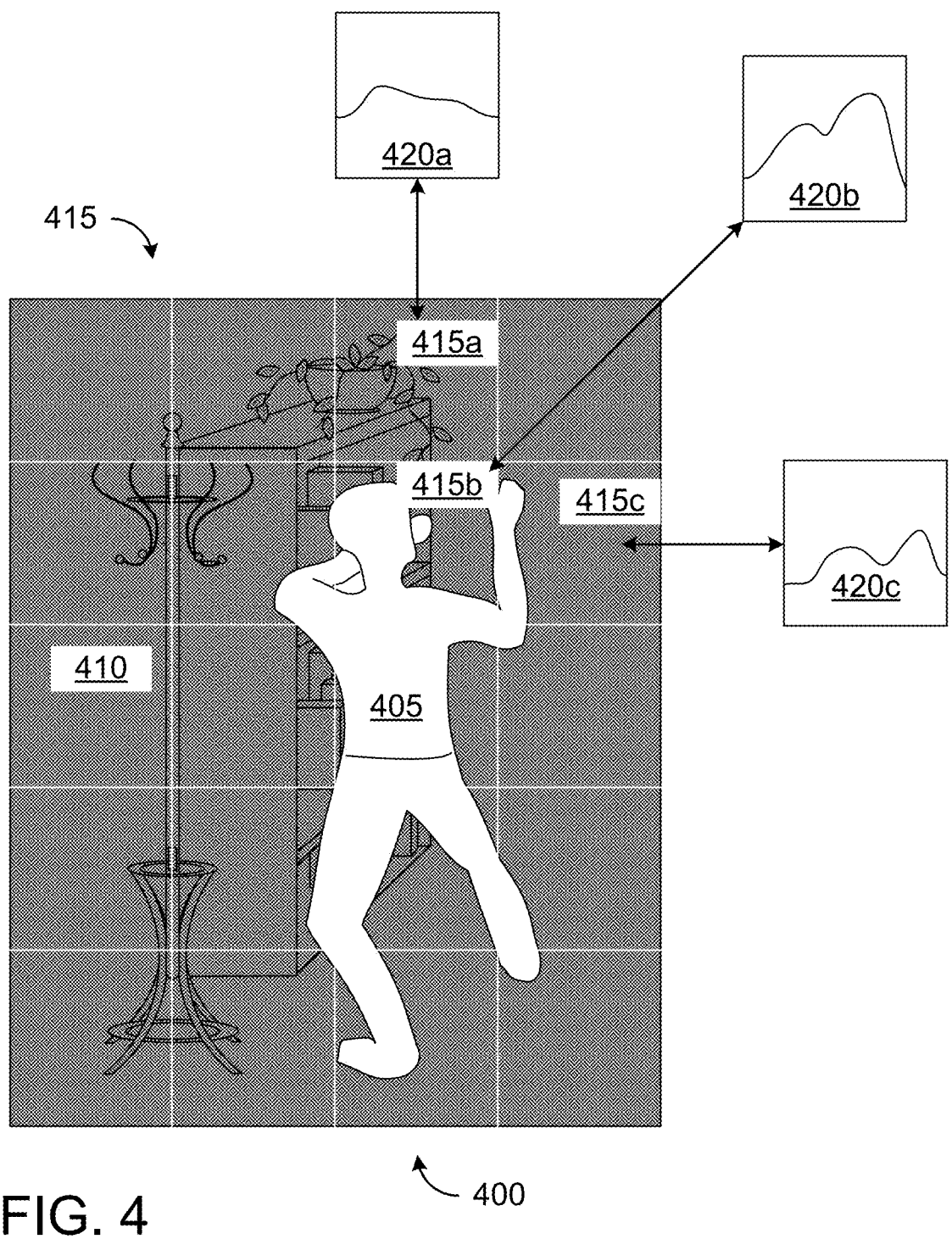
FIG. 4 shows an example tiled image and associated histograms for example tiles.

As an example, FIG. 4 shows an example linear, intensity-based image 400. Image 400 includes foreground object 405 (e.g. high intensity) and background objects 410 (e.g., low intensity). Image 400 has been divided into a plurality of tiles 415. Each tile includes a combination of high intensity and low intensity pixels, giving each an individual histogram signature that does not necessarily match a histogram signature for the entire image 400.

For example, tile 415a includes only low intensity pixels, yielding histogram 420a. Tile 415b includes a significant amount of high intensity pixels, yielding histogram 420b. Tile 415c includes some high intensity pixels and some low intensity pixels, yielding histogram 420c.

Returning to FIG. 3, at 350, method 300 includes, based on the one or more histograms of intensity values, applying local contrast enhancement to the linear, intensity-based image to generate a contrast enhanced version of the linear, intensity-based image. Given a linear, intensity-based image with a broad intensity range, the top of the brightest peak may be considered foreground, and everything else in the environment may be considered background. In a raw image, the foreground will appear bright, and the background will appear dark, with details difficult to perceive.

Contrast enhancement may smooth out this discrepancy. Contrast enhancement may be used to both amplify lower intensity pixels and de-amplify higher intensity pixels. In other words, the dimmer objects (e.g., background objects) are brightened, and the brighter objects (e.g., foreground objects) are dimmed or enhanced with appropriate amounts of contrast. In this way, the details of the environment are presented for easy visual perception by the user.

Any suitable contrast enhancement method may be applied, such as contrast limited adaptive histogram equalization (CLAHE), unsharp mask, etc. In examples where the linear, intensity-based image has been divided into tiles, contrast enhancement may be applied on a tile-by-tile basis in order to increase contrast within every tile via histogram equalization. Contrast enhancement may be performed as a local operation. The applied enhancement may change based on the area of the scene, based on the histogram statistics of that particular area, etc.

CLAHE allows for leveraging histograms that are already readily available. However, CLAHE (as well as other types of local area contrast enhancement) is an algorithm that can hide objects of interest in the scene. If applied in a tile-by-tile basis to enhance the image, that results in more detail for the user, but leads to depressing hot spots relative to background, as the low-lying foothills of the histogram will be amplified, and the mountain peaks will be brought down.

Pixel intensities for hot objects in a thermal image tend to cluster towards one or two primary peaks when viewed as an intensity vs frequency histogram. This is often the primary region desired for colorization, as human body temperature or other objects of interest are likely to emit higher thermal energy than their surroundings. However, by performing local contrast enhancement directly on the received image, the resulting enhanced image loses a lot of the significant peaks from the received image histogram.

As such, at 360, method 300 includes, based on the one or more histograms of intensity values, applying artificial colorization to the linear, intensity-based image to generate an artificially colorized version of the linear, intensity-based image. By performing the artificial colorization process within a different pipeline than the contrast enhancement process, the intensity data for the received image can be leveraged for proper analysis, resulting in more accurate colorization. In other words, the color channel may be used to reintroduce global image information that is lost during contrast enhancement. For thermal imagery, this allows the hottest pixels, which oftentimes correspond to people, to be shown in color.

Figure 5B:
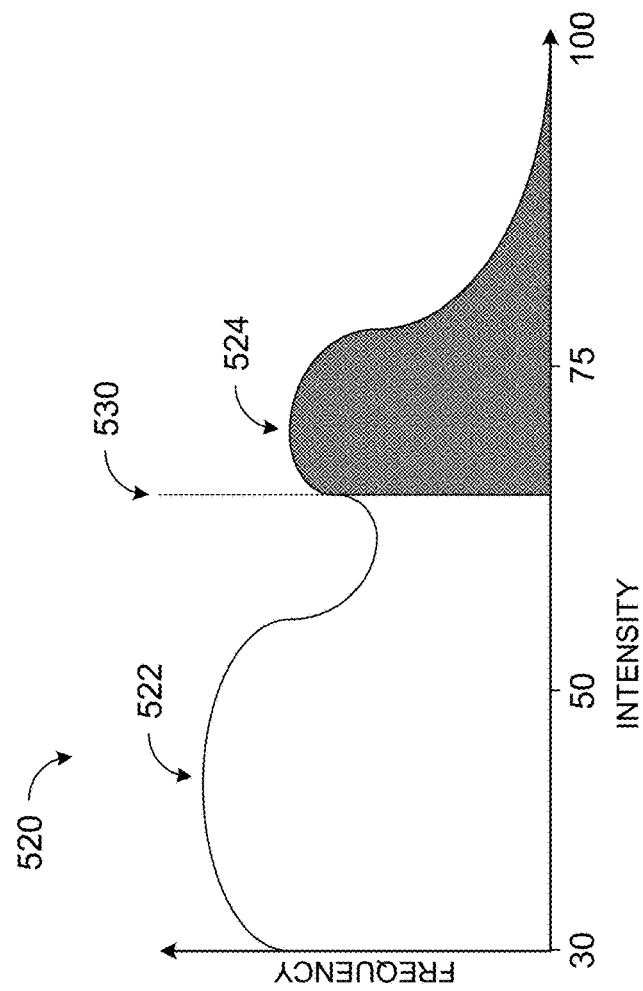
FIG. 5B shows an example histogram of intensity values whereby colorization is performed based on a decision tree.
Figure 5A:
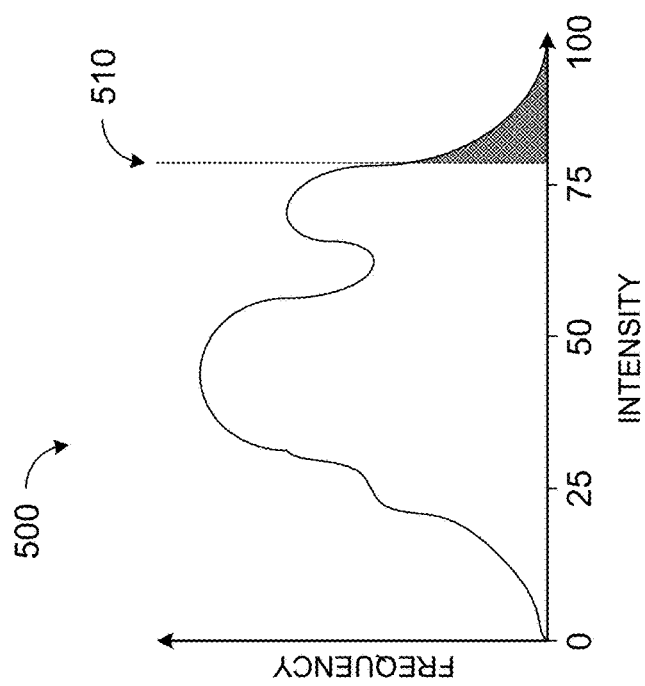
FIG. 5A shows an example histogram of intensity values whereby colorization is performed based on a simple threshold.

In one example, the histogram(s) of intensity values may be analyzed, and artificial colorization applied to pixels having an intensity above a threshold. The threshold may be predetermined or based on the distribution of intensities within the received image. As an example, the pixels in the 90th percentile of intensity (top 10% hottest pixels) may be colorized. The pixels may be given uniform color, or histogram equalization may be used to assign a color value along a spectrum to each pixel. An example is shown in FIG. 5A. Histogram 500 plots intensity (as arbitrary units from 0-100) against pixel frequency. A threshold 510 is applied to histogram 500, such that any pixel with an intensity greater than threshold 510 is colorized. By using a simple threshold, the colorization process may occur rapidly, which may be particularly important in real-time overlay applications.

Alternatively, applying artificial colorization to the linear, intensity-based image based on the histogram of intensity values includes applying a decision tree algorithm to the histogram of intensity values to determine a secondary peak, and applying artificial colorization to pixels having an intensity greater than a shoulder of the secondary peak. An example is shown in FIG. 5B. Histogram 520 is a truncated and expanded version of histogram 500, showing intensity values between 30 and 100. A primary peak 522 and a secondary peak 524 are visible. This two-peak distribution is common in thermal histograms. In a normal environment, there may be a general distribution of temperatures that form the primary peak, with humans and other hotter objects generating a secondary peak. A decision tree algorithm may be configured to identify primary peak 522, then evaluate increasing intensities to determine secondary peak 524. A percentage of secondary peak 524 and values in the higher intensity tail of histogram 520 may then be colorized. The percentage may be predetermined or may be based on the shape of the histogram. For example, the percentage may be based on the shoulder or highest point of secondary peak 524, and may be adjusted based on the breadth of the peak.

In this way, the process essentially pulls out the tail of the histogram and colorizes that part of the image. As with simple thresholding, the same color may be applied to every pixel beyond the threshold intensity. Linear scaling, exponential scaling, etc. could be applied from the determined threshold upwards. The colorization method may be determined based on the characteristics of the display and user/application preferences. For examples where the linear, intensity-based image is tiled, each tile or subset of tiles may be individually evaluated and colorized on a tile-by-tile basis using a decision tree algorithm.

In environments where there is limited area corresponding to hot objects, the objects of interest may not form a predetermined percentage of the image. As such, some background objects may be colorized using an arbitrary threshold. Conversely, if there are a number of hot objects in the scene, some may remain uncolored based on simple thresholding. By using a decision tree, cutoffs or portions of the image that are substantially different may be identified, allowing for intelligent colorization based on the natural contours of the intensity histogram for the image. Such a decision tree may be informed by other information of the environment, such as the low-level light imaging, object detection algorithms, and/or other routines for guided colorization of an image.

Continuing at 370, method 300 includes generating a composite image of the environment based on at least a portion of the contrast enhanced version of the linear, intensity-based image and at least a portion of the artificially colorized version of the linear, intensity-based image. In examples where low-level light imagery is received, at least a portion of the low-level light image may also be composited into the final image. In this way, the composite image may include additional detail that might not be available just from the linear, intensity-based images. For example, if the environment includes a wall, a thermal camera might be able to discern the studs in the wall, while a low light camera might pick up changes in wallpaper patterns. In this way, the final composite image includes multiple inputs, each with a unique set of features.

In some examples, the entirety of one or more of the contrast enhanced image, the artificially colorized image, and the low-level light image may be composited into the final image. For example, the full contrast-enhanced image may be composited with portions of the artificially colorized image by colorizing only the pixels and/or tiles that received artificial colorization. In some examples, rectangular or polygonal regions may be determined from received linear data and used to colorize those regions in the contrast enhanced image. However, any portion of the sub-images may be used, for example, to adhere to the memory and computational limitations of the device.

Figure 6:
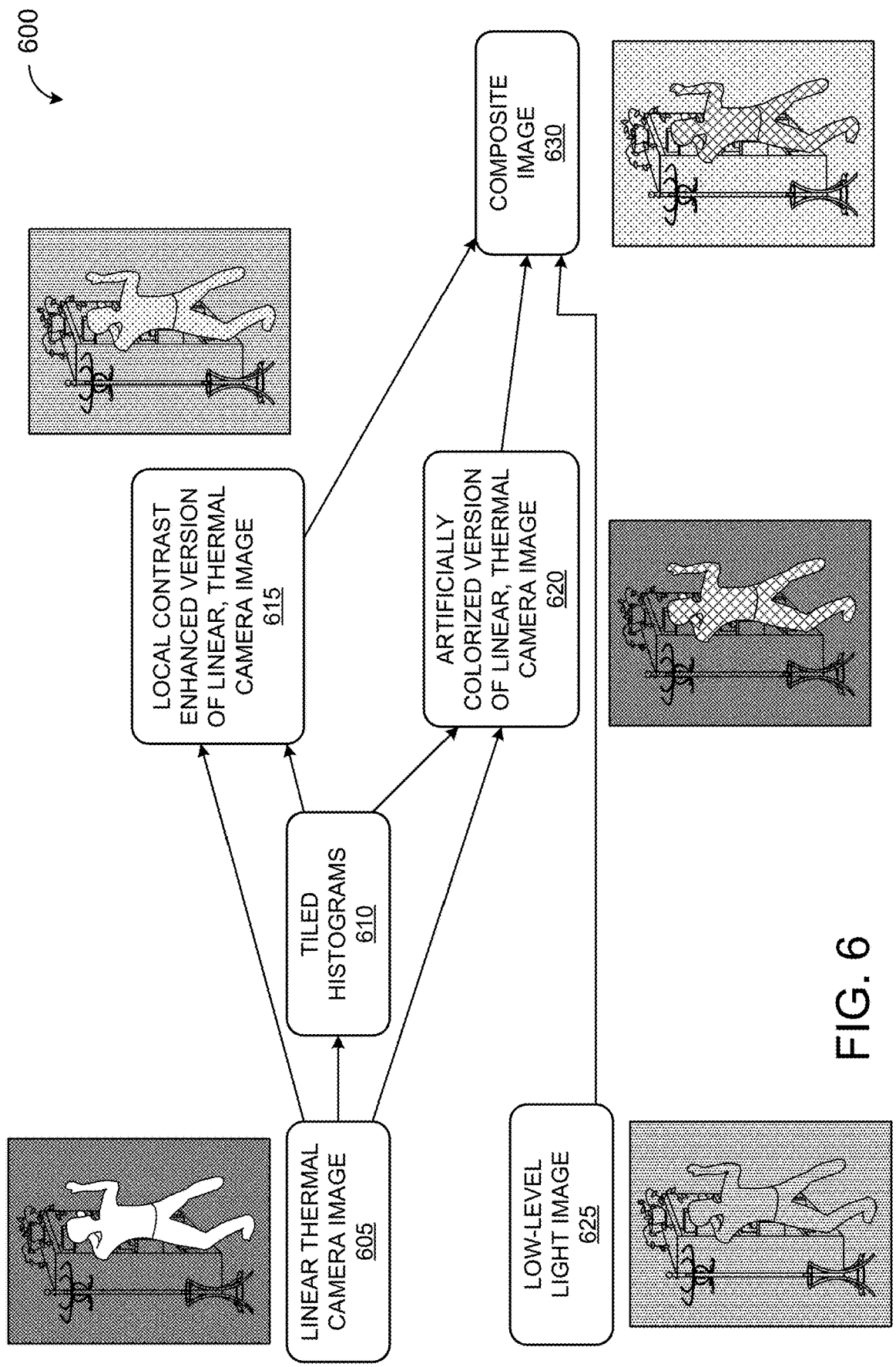
FIG. 6 shows an example workflow for the method depicted in FIG. 3.

As an example, FIG. 6 shows a process flow for enhancing a digital image. A linear thermal camera image 605 is received, as well as a low-level light image. Tiled histograms 610 may optionally be generated for linear thermal camera image 605. Linear thermal camera image 605 and, when applicable, tiled histograms 610 may be used to generate local contrast enhanced version of linear, thermal image 615 and to generate artificially colorized version of linear, thermal image 620. Local contrast enhanced version of linear, thermal image 615, artificially colorized version of linear, thermal image 620, and low-level light image 625 are then composited together to generate composite image 630. Composite image 630 thus has foreground objects artificially colored and background objects presented at high contrast, relative to linear thermal camera image 605.

Continuing at 380, method 300 may optionally include overlaying the composite image in real-time for a user viewing the environment via a display. For example, this may include presenting composite images in real time for a user viewing the environment via a see-through display or an opaque display, be it a head-mounted opaque display (e.g., VR headset), portable computer, tablet, phone, etc., or on a display located distally from the environment itself. In this way, the thermal imagery and enhanced contrast imagery may be provided to a user and adjusted as the user and/or the linear, intensity-based imaging device moves through the environment, and/or as the position of objects within the environment changes over time. Such overlaying may be applied to automotive windshields, other see-through displays installed in vehicles, aircraft, seacraft, etc.

In some use-cases, it may be desired to only view the colorized portion of the composite image. In such a scenario, the artificially colorized version of the linear, intensity-based image may be used as a mask to remove non-colorized imagery from the display. The process of generating the composite image may provide additional detail not available by merely applying artificial colorization as described at 350 or otherwise. For example, a user wearing a head-mounted display with a see-through display during the daytime would not necessarily need the additional contrast-enhanced details, but may want to determine whether human-shaped objects are alive and producing thermal energy.

In some embodiments, the methods and processes described herein may be tied to a computing system of one or more computing devices. In particular, such methods and processes may be implemented as a computer-application program or service, an application-programming interface (API), a library, and/or other computer-program product.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a storage machine 720. Computing system 700 may optionally include a display subsystem 730, input subsystem 740, communication subsystem 750, and/or other components not shown in FIG. 7.

Logic machine 710 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 720 includes one or more physical devices configured to hold instructions executable by the logic machine to implement the methods and processes described herein. When such methods and processes are implemented, the state of storage machine 720 may be transformed—e.g., to hold different data.

Storage machine 720 may include removable and/or built-in devices. Storage machine 720 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 720 may include volatile, nonvolatile, dynamic, static, read/write, read-only, random-access, sequential-access, location-addressable, file-addressable, and/or content-addressable devices.

It will be appreciated that storage machine 720 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 710 and storage machine 720 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by storage machine 720. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 730 may be used to present a visual representation of data held by storage machine 720. This visual representation may take the form of a graphical user interface (GUI). As the herein described methods and processes change the data held by the storage machine, and thus transform the state of the storage machine, the state of display subsystem 730 may likewise be transformed to visually represent changes in the underlying data. Display subsystem 730 may include one or more display devices utilizing virtually any type of technology. Such display devices may be combined with logic machine 710 and/or storage machine 720 in a shared enclosure, or such display devices may be peripheral display devices.

When included, input subsystem 740 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 750 may be configured to communicatively couple computing system 700 with one or more other computing devices. Communication subsystem 750 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

As an example, a method for enhancing digital imagery comprises receiving a linear, intensity-based image of an environment; generating one or more histograms of intensity values for a set of pixels within the linear, intensity-based image; based on the one or more histograms of intensity values, applying local contrast enhancement to the linear, intensity-based image to generate a contrast enhanced version of the linear, intensity-based image; based on the one or more histograms of intensity values, applying artificial colorization to the linear, intensity-based image to generate an artificially colorized version of the linear, intensity-based image; and generating a composite image of the environment based on at least a portion of the contrast enhanced version of the linear, intensity-based image and at least a portion of the artificially colorized version of the linear, intensity-based image. In such an example, or any other example the linear, intensity-based image is additionally or alternatively a thermal image, and the intensity values additionally or alternatively indicate an amount of thermal radiation for each of the set of pixels. In any of the preceding examples, or any other example, generating one or more histograms of intensity values for a set of pixels within the linear, intensity-based image additionally or alternatively comprises dividing the linear, intensity-based image into a plurality of tiles; and generating one or more histograms of intensity values for each set of pixels in each of the plurality of tiles. In any of the preceding examples, or any other example, local contrast enhancement and artificial colorization are additionally or alternatively applied on a tile-by-tile basis based on the one or more histograms of intensity values associated with each tile. In any of the preceding examples, or any other example, applying artificial colorization to the linear, intensity-based image based on each histogram of intensity values additionally or alternatively includes applying a decision tree algorithm to each histogram of intensity values to determine a secondary peak, and applying artificial colorization to pixels having an intensity greater than a shoulder of the secondary peak. In any of the preceding examples, or any other example, applying artificial colorization to the linear, intensity-based image based on each histogram of intensity values additionally or alternatively includes applying artificial colorization to pixels having an intensity above a threshold. In any of the preceding examples, or any other example, the method additionally or alternatively comprises receiving a low-level light image of the environment; and generating the composite image of the environment based on at least a portion of the contrast enhanced version of the linear, intensity-based image, at least a portion of the artificially colorized version of the linear, intensity-based image, and at least a portion of the low-level light image of the environment. In any of the preceding examples, or any other example, the method additionally or alternatively comprises presenting the composite image of the environment on a see-through display.

In another example, a system for a head-mounted display, comprises a see-through display; one or more thermal cameras; one or more low-level light cameras; and a storage machine holding instructions executable by a logic machine to: receive a linear, thermal image of an environment from the one or more thermal cameras; receive a low-level light image of the environment from the one or more low-level light cameras; generate one or more histograms of intensity values for a set of pixels within the linear, thermal image; based on the one or more histograms of intensity values, apply local contrast enhancement to the linear, thermal image to generate a contrast enhanced version of the linear, thermal image; based on the one or more histograms of intensity values, apply artificial colorization to the linear, thermal image to generate an artificially colorized version of the linear, thermal image; and generate a composite image of the environment based on at least a portion of the contrast enhanced version of the linear, thermal image, at least a portion of the artificially colorized version of the linear, thermal image, and at least a portion of the low-level light image of the environment. In such an example, or any other example applying artificial colorization to the linear, thermal image based on each histograms of intensity values additionally or alternatively includes applying a decision tree algorithm to each histogram of intensity values to determine a secondary peak, and applying artificial colorization to pixels having an intensity greater than a shoulder of the secondary peak. In any of the preceding examples, or any other example, applying artificial colorization to the linear, thermal image based on each histogram of intensity values additionally or alternatively includes applying artificial colorization to pixels having an intensity above a threshold. In any of the preceding examples, or any other example, the storage machine additionally or alternatively holds instructions executable by the logic machine to present the composite image of the environment on the see-through display. In any of the preceding examples, or any other example, presenting the composite image of the environment on the see-through display additionally or alternatively comprises overlaying the composite image of the environment in real-time for a user viewing the environment via the see-through display. In any of the preceding examples, or any other example, overlaying the composite image of the environment in real-time additionally or alternatively includes using the artificially colorized version of the linear, thermal image as a mask to remove non-colorized imagery from the see-through display.

In yet another example, a method for enhancing digital imagery comprises receiving a linear, thermal image of an environment from one or more thermal cameras; receiving a low-level light image of the environment from one or more low-level light cameras; dividing the linear, thermal image into a plurality of tiles; generating one or more histograms of intensity values for each set of pixels in each of the plurality of tiles; based on the one or more histograms of intensity values, applying local contrast enhancement to the linear, thermal image to generate a contrast enhanced version of the linear, thermal; based on the one or more histograms of intensity values, applying artificial colorization to the linear, thermal image to generate an artificially colorized version of the linear, thermal image; generating a composite image of the environment based on at least a portion of the contrast enhanced version of the linear, thermal image, at least a portion of the artificially colorized version of the linear, thermal image, and at least a portion of the low-level light image of the environment; and overlaying the composite image of the environment in real-time for a user viewing the environment via a see-through display. In such an example, or any other example applying artificial colorization to the linear, thermal image based on each histogram of intensity values additionally or alternatively includes applying a decision tree algorithm to each histogram of intensity values to determine a secondary peak, and applying artificial colorization to pixels having an intensity greater than a shoulder of the secondary peak. In any of the preceding examples, or any other example, applying artificial colorization to the linear, thermal image based on each histogram of intensity values additionally or alternatively includes applying artificial colorization to pixels having an intensity above a threshold. In any of the preceding examples, or any other example, overlaying the composite image of the environment in real-time additionally or alternatively includes using the artificially colorized version of the linear, thermal image as a mask to remove non-colorized imagery from the see-through display. In any of the preceding examples, or any other example, the see-through display is additionally or alternatively included in a head-mounted display system. In any of the preceding examples, or any other example, the see-through display is additionally or alternatively included in an automotive windshield.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for enhancing digital imagery, comprising:
   receiving a linear, intensity-based image of an environment;
   generating one or more histograms of intensity values for a set of pixels within the linear, intensity-based image;
   based on the one or more histograms of intensity values, applying local contrast enhancement to the linear, intensity-based image to generate a contrast enhanced version of the linear, intensity-based image;
   in parallel to applying the local contrast enhancement to the linear, intensity-based image, based on the one or more histograms of intensity values, applying artificial colorization to the linear, intensity-based image to generate an artificially colorized version of the linear, intensity-based image; and
   generating a composite image of the environment based on at least a portion of the contrast enhanced version of the linear, intensity-based image and at least a portion of the artificially colorized version of the linear, intensity-based image.

2. The method of claim 1, wherein the linear, intensity-based image is a thermal image, and wherein the intensity values indicate an amount of thermal radiation for each of the set of pixels.

3. The method of claim 1, wherein generating one or more histograms of intensity values for a set of pixels within the linear, intensity-based image comprises:
   dividing the linear, intensity-based image into a plurality of tiles; and
   generating one or more histograms of intensity values for each set of pixels in each of the plurality of tiles.

4. The method of claim 3, wherein local contrast enhancement and artificial colorization are applied on a tile-by-tile basis based on the one or more histograms of intensity values associated with each tile.

5. The method of claim 1, wherein applying artificial colorization to the linear, intensity-based image based on each histogram of intensity values includes applying a decision tree algorithm to each histogram of intensity values to determine a secondary peak, and applying artificial colorization to pixels having an intensity greater than a shoulder of the secondary peak.

6. The method of claim 1, wherein applying artificial colorization to the linear, intensity-based image based on each histogram of intensity values includes applying artificial colorization to pixels having an intensity above a threshold.

7. The method of claim 1, further comprising:
receiving a low-level light image of the environment; and
generating the composite image of the environment based on at least a portion of the contrast enhanced version of the linear, intensity-based image, at least a portion of the artificially colorized version of the linear, intensity-based image, and at least a portion of the low-level light image of the environment.

8. The method of claim 1, further comprising:
presenting the composite image of the environment on a see-through display.

9. A system for a head-mounted display, comprising:
a see-through display;
one or more thermal cameras;
one or more low-level light cameras; and
a storage machine holding instructions executable by a logic machine to:
receive a linear, thermal image of an environment from the one or more thermal cameras;
receive a low-level light image of the environment from the one or more low-level light cameras;
generate one or more histograms of intensity values for a set of pixels within the linear, thermal image;
based on the one or more histograms of intensity values, apply local contrast enhancement to the linear, thermal image to generate a contrast enhanced version of the linear, thermal image;
in parallel to applying the local contrast enhancement to the linear, intensity-based image, based on the one or more histograms of intensity values, apply artificial colorization to the linear, thermal image to generate an artificially colorized version of the linear, thermal image; and
generate a composite image of the environment based on at least a portion of the contrast enhanced version of the linear, thermal image, at least a portion of the artificially colorized version of the linear, thermal image, and at least a portion of the low-level light image of the environment.

10. The system of claim 9, wherein applying artificial colorization to the linear, thermal image based on each histograms of intensity values includes applying a decision tree algorithm to each histogram of intensity values to determine a secondary peak, and applying artificial colorization to pixels having an intensity greater than a shoulder of the secondary peak.

11. The system of claim 9, wherein applying artificial colorization to the linear, thermal image based on each histogram of intensity values includes applying artificial colorization to pixels having an intensity above a threshold.

12. The system of claim 9, wherein the storage machine further holds instructions executable by the logic machine to:
present the composite image of the environment on the see-through display.

13. The system of claim 12, wherein presenting the composite image of the environment on the see-through display further comprises overlaying the composite image of the environment in real-time for a user viewing the environment via the see-through display.

14. The system of claim 13, wherein overlaying the composite image of the environment in real-time includes using the artificially colorized version of the linear, thermal image as a mask to remove non-colorized imagery from the see-through display.

15. A method for enhancing digital imagery, comprising:
receiving a linear, thermal image of an environment from one or more thermal cameras;
receiving a low-level light image of the environment from one or more low-level light cameras;
dividing the linear, thermal image into a plurality of tiles;
generating one or more histograms of intensity values for each set of pixels in each of the plurality of tiles;
based on the one or more histograms of intensity values, applying local contrast enhancement to the linear, thermal image to generate a contrast enhanced version of the linear, thermal image;
in parallel to applying the local contrast enhancement to the linear, intensity-based image, based on the one or more histograms of intensity values, applying artificial colorization to the linear, thermal image to generate an artificially colorized version of the linear, thermal image;
generating a composite image of the environment based on at least a portion of the contrast enhanced version of the linear, thermal image, at least a portion of the artificially colorized version of the linear, thermal image, and at least a portion of the low-level light image of the environment; and
overlaying the composite image of the environment in real-time for a user viewing the environment via a see-through display.

16. The method of claim 15, wherein applying artificial colorization to the linear, thermal image based on each histogram of intensity values includes applying a decision tree algorithm to each histogram of intensity values to determine a secondary peak, and applying artificial colorization to pixels having an intensity greater than a shoulder of the secondary peak.

17. The method of claim 15, wherein applying artificial colorization to the linear, thermal image based on each histogram of intensity values includes applying artificial colorization to pixels having an intensity above a threshold.

18. The method of claim 15, wherein overlaying the composite image of the environment in real-time includes using the artificially colorized version of the linear, thermal image as a mask to remove non-colorized imagery from the see-through display.

19. The method of claim 15, wherein the see-through display is included in a head-mounted display system.

20. The method of claim 15, wherein the see-through display is included in an automotive windshield.

* * * * *